(12) United States Patent
Kushida

(10) Patent No.: US 8,243,293 B2
(45) Date of Patent: Aug. 14, 2012

(54) IMAGE FORMING DEVICE FOR PRINTING IN A SELECTED REGION, AND METHOD AND COMPUTER READABLE MEDIUM THEREFOR

(75) Inventor: Tsuyoshi Kushida, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 980 days.

(21) Appl. No.: 12/241,121

(22) Filed: Sep. 30, 2008

(65) Prior Publication Data

US 2009/0091773 A1 Apr. 9, 2009

(30) Foreign Application Priority Data

Oct. 5, 2007 (JP) ................................. 2007-262356

(51) Int. Cl.
G06K 15/00 (2006.01)
(52) U.S. Cl. ...................................... 358/1.12
(58) Field of Classification Search .................. 358/1.12
See application file for complete search history.

(56) References Cited

U.S. PATENT DOCUMENTS 6,626,101 B2 9/2003 Kajiwara et al.
2002/0043164 A1 4/2002 Kajiwara et al.

FOREIGN PATENT DOCUMENTS

| JP | 09-081006 | 3/1997 |
| JP | 2000-284561 | 10/2000 |
| JP | 2002-091115 | 3/2002 |
| JP | 2002-091118 | 3/2002 |
| JP | 2006-235391 | 9/2006 |

OTHER PUBLICATIONS

JP 2002-091118, IDS (machine translation).*
JP 2006-235391, IDS (machine translation).*
Notification of Reasons of Rejection for Japanese Application No. 2007-262356 mailed Sep. 1, 2009.

* cited by examiner

Primary Examiner — Benny Q Tieu
Assistant Examiner — Qian Yang
(74) Attorney, Agent, or Firm — Banner & Witcoff, Ltd.

(57) ABSTRACT

An image forming device includes a rotational body carrying a sheet thereon, the rotational body including first regions defined thereon that begin with respective different phases on the rotational body, a forming unit forming an image on one of the rotational body and the sheet carried on the rotational body, a storage unit storing thereon information regarding positional deviations of images formed within each of the first regions, a region specifying unit that determines a variation of the positional deviations of the images within each of the first regions based upon the information stored and specifies one of the first regions based upon the determined variation, and a control unit controlling the forming unit to form an intended image of which an image forming position is corrected based upon the information stored, in the first region specified on the rotational body.

14 Claims, 9 Drawing Sheets

|  | CORRECTION VALUE WC BETWEEN BLACK AND CYAN | CORRECTION VALUE WM BETWEEN BLACK AND MAGENTA | CORRECTION VALUE WY BETWEEN BLACK AND YELLOW |
|---|---|---|---|
| AVERAGE ENTIRE CIRCUMFERENCE CORRECTION VALUE | 2 | 2 | 2 |

FIG. 6

| N | AVERAGE REGIONAL CORRECTION VALUE H(N)C BETWEEN BLACK AND CYAN | AVERAGE REGIONAL CORRECTION VALUE H(N)M BETWEEN BLACK AND MAGENTA | AVERAGE REGIONAL CORRECTION VALUE H(N)Y BETWEEN BLACK AND YELLOW |
|---|---|---|---|
| 1 | 2 | 3 | 3 |
| 2 | 2 | 1 | 2 |
| 3 | 1 | 1 | 1 |
| 4 | 1 | 1 | 1 |
| 5 | 3 | 2 | 4 |
| 6 | 3 | 4 | 3 |
| 7 | 3 | 3 | 2 |
| 8 | 4 | 3 | 1 |

FIG. 7

IMAGE FORMING DEVICE FOR PRINTING IN A SELECTED REGION, AND METHOD AND COMPUTER READABLE MEDIUM THEREFOR

CROSS-REFERENCE TO RELATED APPLICATION

This application claims priority under 35 U.S.C. §119 from Japanese Patent Application No. 2007-262356 filed on Oct. 5, 2007. The entire subject matter of the application is incorporated herein by reference.

BACKGROUND

1. Technical Field

The following description relates to one or more techniques to correct an image forming property of an image forming device.

2. Related Art

An image forming device such as a color laser printer has been known, which includes a plurality of image forming units aligned along a sheet carrying belt such that toner images of respective different colors are sequentially transferred onto a sheet being conveyed on the sheet carrying belt by the image forming units. In such an image forming device, when the respective toner images are transferred into different positions on the sheet by the image forming units, a formed image becomes a low-quality one.

In order to secure the quality of the image, a technique referred to as registration to correct positional deviations between the toner images transferred onto the sheet has been employed. According to such a correction technique, a pattern including a plurality of marks is formed on a surface of the sheet carrying belt by each image forming unit, and the positional deviations between different color toner images are determined by detecting locations of the marks with an optical sensor. Then, based upon a result of the detection, the positional deviations between the toner images are corrected. It is noted that the measured deviations may periodically fluctuate due to unevenness in thickness of the sheet carrying belt. Therefore, in general, the patterns are formed throughout a circuit of the sheet carrying belt. The positional deviations of the marks included in the pattern are measured in a plurality of locations on the sheet carrying belt, and the positional deviation correction is performed based upon an average value of the positional deviations measured.

However, the sheet carrying belt has an region thereon in which an actual positional deviation is significantly different from the average value of the positional deviations determined based upon the patterns formed throughout an entire circumference of the sheet carrying belt. Therefore, when the average value throughout the entire circumference of the sheet carrying belt is utilized in the case where a sheet is conveyed in the region, the image quality is deteriorated. In order to overcome this problem, an image forming device has been proposed, in which a region on the belt to be used for carrying a sheet is searched, and the positional deviation correction is performed using an average value of positional deviations determined based upon the pattern formed within the searched region (see Japanese Patent Provisional Publication No. 2002-91115).

SUMMARY

In the proposed image forming device, however, a region, which shows therein a larger difference between an actual positional deviation and the average value than any other region, might be searched. Thus the image quality might not sufficiently be secured.

Aspects of the present invention are advantageous to provide one or more improved image forming devices, methods, and computer readable media that make it possible to secure image quality provided by the image forming devices.

According to aspects of the present invention, an image forming device is provided, which includes a rotational body configured to carry a recording medium thereon in a predetermined direction, the rotational body including a plurality of first regions defined thereon that begin with respective different phases on the rotational body, a forming unit configured to form an image on one of the rotational body and the recording medium carried on the rotational body, a storage unit configured to store thereon information regarding positional deviations of images formed within each of the first regions, a region specifying unit configured to determine a variation of the positional deviations of the images within each of the first regions based upon the information stored on the storage unit and to specify one of the first regions based upon the determined variation of the positional deviations of the images within each of the first regions, and a control unit configured to control the forming unit to form an intended image of which an image forming position is corrected based upon the information stored on the storage unit, in the first region specified on the rotational body by the region specifying unit.

In some aspects of the present invention, one of the first regions on the rotational body in which the intended image is to be formed by the forming unit is specified based upon the variation of the positional deviations of the images within each of the first regions. Thereby, for instance, a first region that shows therein a small degree of variance of the positional deviations of the images can be specified as a region in which the intended image is to be formed by the forming unit in preference to any other first region that shows therein a larger variance of positional deviations of images. Thus, it is possible to secure quality of an image formed. It is noted that a first region beginning with a phase may partially overlap another first region beginning with a different phase on the rotational body.

According to aspects of the present invention, further provided is a method to correct an image forming position of an image to be formed by an image forming device that has a rotational body configured to carry a recording medium thereon in a predetermined direction, the rotational body including a plurality of first regions defined thereon that begin with respective different phases on the rotational body. The method includes a pattern forming step of forming patterns on the rotational body, a variation determining step of determining a variation of positional deviations of the patterns formed in the pattern forming step within each of the first regions, a region specifying step of specifying one of the first regions based upon the determined variation of the positional deviations of the patterns within each of the first regions, a first correction value determining step of determining a first correction value to correct an image forming position of the image to be formed, based upon the positional deviations of the patterns within the first region specified in the region specifying step, and an image forming step of forming the image of which the image forming position is corrected using the first correction value determined in the first correction value determining step, in the first region specified on the rotational body.

In the method configured as above, one of the first regions on the rotational body in which the image is to be formed is specified based upon the variation of the positional deviations of the patterns within each of the first regions. Thereby, for instance, a first region that shows a small degree of variance of the positional deviations of the patterns therein can be specified as a region in which the image is to be formed in preference to any other first region that shows a larger variance of the positional deviations of the patterns therein. Thus, it is possible to secure the quality of the image.

According to aspects of the present invention, further provided is a computer readable medium having computer executable instructions stored thereon to be executed by an image forming device that has a rotational body configured to carry a recording medium thereon in a predetermined direction, the rotational body including a plurality of first regions defined thereon that begin with respective different phases on the rotational body. The instructions causes the image forming device to perform a pattern forming step of forming patterns on the rotational body, a variation determining step of determining a variation of positional deviations of the patterns formed in the pattern forming step within each of the first regions, a region specifying step of specifying one of the first regions based upon the determined variation of the positional deviations of the patterns within each of the first regions, a first correction value determining step of determining a first correction value to correct an image forming position of the image to be formed, based upon the positional deviations of the patterns within the first region specified in the region specifying step, and an image forming step of forming the image of which the image forming position is corrected using the first correction value determined in the first correction value determining step, in the first region specified on the rotational body.

The computer readable medium configured as above can provide the same effect as the aforementioned method.

BRIEF DESCRIPTION OF THE ACCOMPANYING DRAWINGS

FIG. 6 shows a data table that stores therein an average entire circumference correction value for each correction color in the embodiment according to one or more aspects of the present invention.

FIG. 7 shows a table that represents correspondence between detection region numbers and average regional correction values in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, an embodiment according to aspects of the present invention will be described with reference to the accompany drawings.

(Overall Configuration of Printer)

Figure 1:
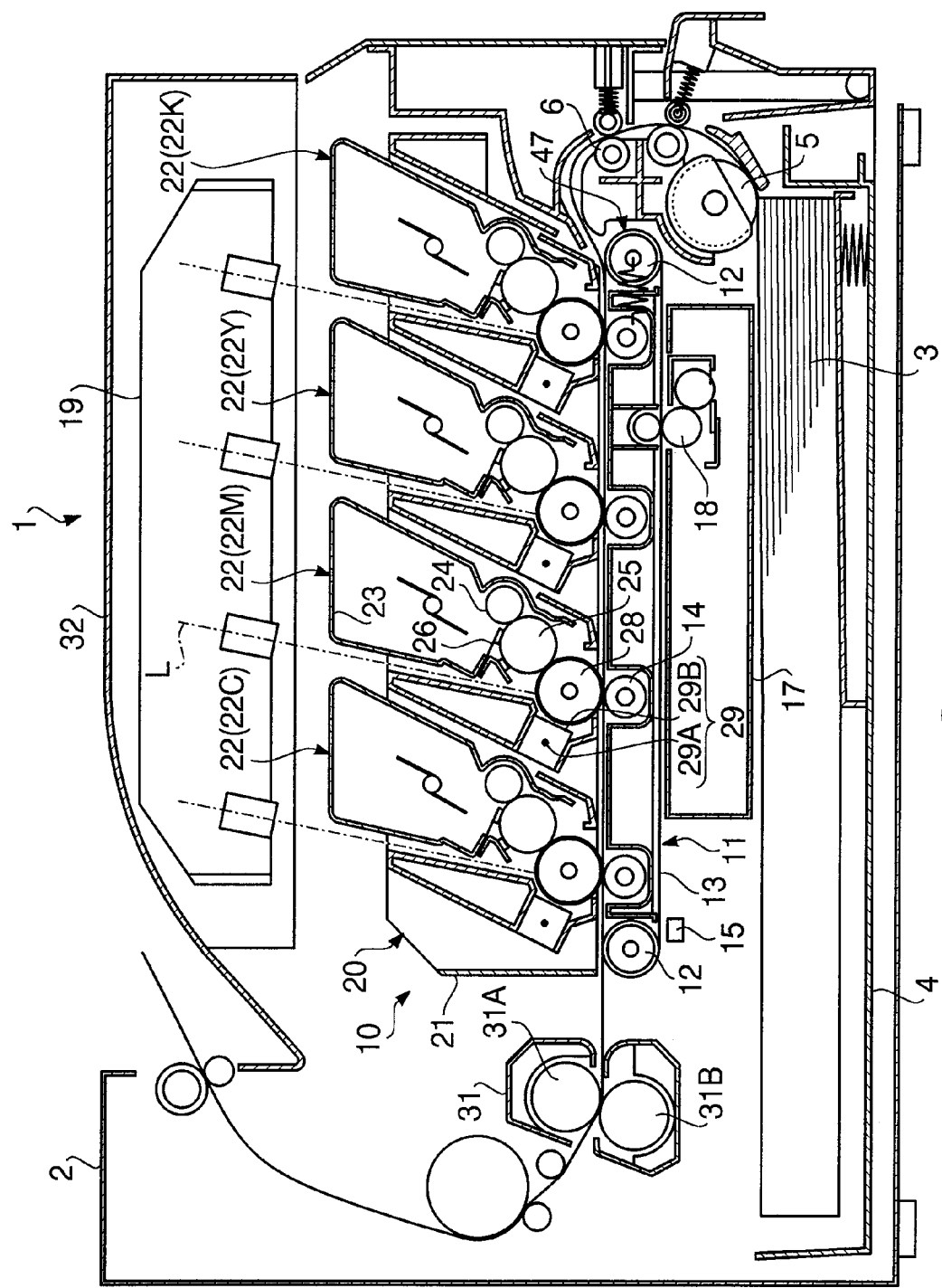
FIG. 1 is a cross-sectional side view schematically showing a configuration of a printer in an embodiment according to one or more aspects of the present invention.

FIG. 1 is a cross-sectional side view schematically showing a configuration of a printer 1 according to aspects of the present invention. It is noted that the following description will be given under an assumption that a right side of FIG. 1 is defined as a front side of the printer 1.

The printer 1 is provided with a casing 2. At a bottom of the casing 2, a sheet feed tray 4 is provided, which is configured to be loaded with one or more sheets 3 as recording media. On an upper front side of the sheet feed tray 4, a sheet feed roller 5 is provided. Along with rotation of the sheet feed roller 5, a top sheet 3 placed in the sheet feed tray 4 is conveyed to a registration roller 6. After skew correction of the sheet 3, the registration roller 6 carries the sheet 3 onto a belt unit 11 of an image forming unit 10.

The image forming unit 10 includes the belt unit 11, a scanner unit 19, a process unit 20, and a fixing unit 31.

The belt unit 11 is configured with a belt 13 made of polycarbonate being strained around a pair of front and rear belt supporting rollers 12. When the rear belt supporting roller 12 is driven and rotated, the belt 13 is revolved in a counterclockwise direction, and the sheet 3 on the belt 13 is conveyed backward. Further, inside the belt 13, transfer rollers 14 are provided to face respective photoconductive drums 28 of the process unit 20 via the belt 13.

Additionally, a pair of pattern detecting sensors 15, configured to detect a pattern formed on the belt 13, is provided to face a lower side surface of the belt 13. The pattern detecting sensors 15 are configured to emit light onto the surface of the belt 13, receive the light reflected by the surface of the belt 13 with a phototransistor, and output a signal of a level corresponding to an intensity of the received light. Further, at a lower side of the belt unit 11, a cleaning unit 17 is provided, which is configured to collect toner and/or paper dusts adhered to the surface of the belt 13.

The scanner unit 19 is configured to illuminate a surface of each photoconductive drum 28 with a laser beam L emitted by a laser emitting unit (not shown) corresponding to each color.

The process unit 20 includes a frame 21 and development cartridges 22 (22Y, 22M, 22C, and 22K) corresponding to respective four colors (yellow, magenta, cyan, and black), which cartridges are detachably attached to four cartridge attachment portions provided to the frame, respectively. It is noted that the process unit 20 is configured to be drawn forth when a front cover 2A provided at a front of the casing 2 is opened. Further, in a state where the process unit 20 is detached from the casing 2, the belt unit 11 and the cleaning unit 17 can be attached to and detached from the casing 2. At a lower side of the frame 21, a photoconductive drum 28, of which a surface is covered with a photoconductive layer having a property to be positively charged, and a scorotron type charger 29 are provided to correspond to each development cartridge 22.

Each development cartridge 22 includes, at an upper side in a box-shaped casing, a toner container 23 configured to store therein toner as developer of each color. Further, each development cartridge 22 includes, under the toner container 23, a supply roller 24, a development roller 25, a layer thickness controlling blade 26, and an agitator 27. Some toner in the toner container 23 is supplied to the development roller 25 through rotation of the supply roller 24 and positively charged through friction between the supply roller 24 and the development rollers 25. Further, the toner supplied onto the development roller 25 is introduced into between the layer thickness controlling blade 26 and the development roller 25 through rotation of the development roller 25. Then, the toner is sufficiently charged due to friction here and held on the development roller 25 as a thin layer with a constant thickness.

In an image forming operation, the photoconductive drum 28 is rotated, and thereby the surface of the photoconductive drum 28 is evenly and positively charged by the charger 29. Then, the positively charged surface is exposed through fast scanning with the laser beam emitted by the scanner unit 19, and an electrostatic latent image corresponding to an image to be formed on the sheet 3 is formed on the surface of the photoconductive drum 28.

Subsequently, when contacting the photoconductive drum 28 through the rotation of the development roller 25, the positively charged toner held on the development roller 25 is supplied to the electrostatic latent image formed on the surface of the photoconductive drum 28. Thereby, a toner image formed with the toner adhered to the exposed portions thereon is held on the surface of the photoconductive drum 28, and thus the electrostatic latent image on the photoconductive drum 28 is visualized.

After that, the toner image held on the surface of each photoconductive drum 28 is sequentially transferred onto the sheet 3 by a negative transfer voltage applied to the transfer roller 14 while the sheet 3 conveyed on the belt 13 passes through a transfer position between the photoconductive drum 28 and the transfer roller 14. Then, the sheet 3 with the toner image thus transferred thereon is conveyed to the fixing unit 31.

The fixing unit 31 includes a heating roller 31A having a heating source and a pressing roller 31B configured to press the sheet 3 against the heating roller 31A. The fixing unit 31 is configured to thermally fix the toner image transferred onto the sheet 3. Then, the sheet 3 with the toner image fixed thereon is conveyed upward and discharged onto a catch tray 32 provided on an upper face of the casing 2.

Figure 2:
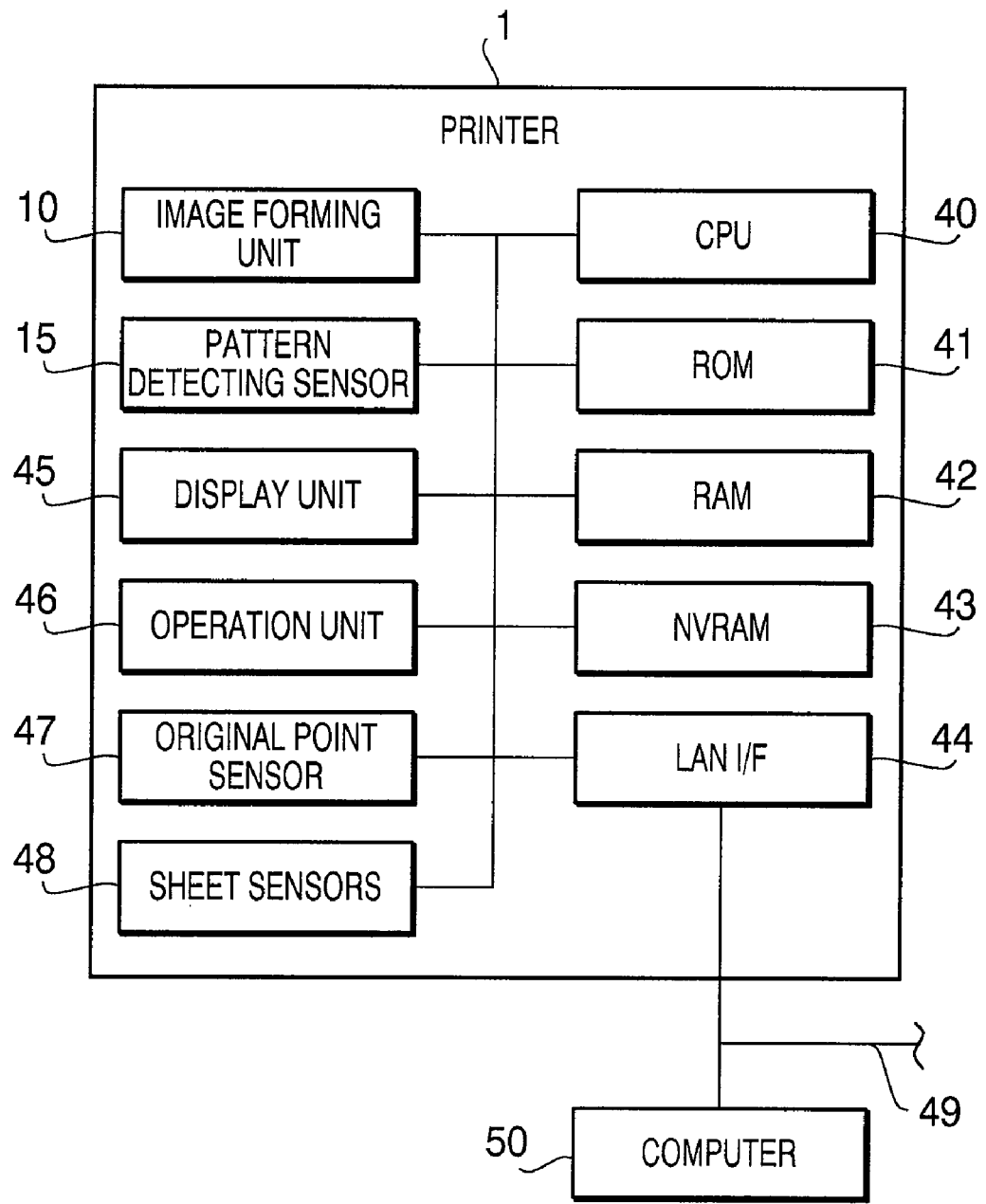
FIG. 2 is a block diagram showing an electrical configuration of the printer in the embodiment according to one or more aspects of the present invention.

(Electrical Configuration of Printer)
FIG. 2 is a block diagram showing electrical configurations of the printer 1 and a computer 50 connected with the printer 1 via a network. As shown in FIG. 2, the printer 1 includes a CPU 40, a ROM 41, a RAM 42, an NVRAM 43, and a network interface 44, which are connected with the image forming unit 10, the pattern detecting sensors 15, a display unit 45, an operation unit 46, an original point sensor 47, and sheet sensors 48.

The ROM 41 stores thereon programs for executing various operations of the printer 1 such as a below-mentioned positional deviation correcting operation. The CPU 40 controls each element included in the printer 1 in accordance with a program read out from the ROM 41 while saving processing results onto the RAM 42 or the NVRAM 43. The network interface 44 is linked with the external computer 50 via a communication line 49 to attain mutual data communication therebetween.

The display unit 45 is provided with a liquid crystal display (LCD) and lamps and configured to display various setting screens and an operational status of the printer 1. The operation unit 46 is provided with buttons and configured to accept various user inputs through the buttons. The original point sensor 47 is configured to detect an original point mark given into a predetermined original point on the belt 13. The sheet sensors 48 are disposed in a plurality of positions on a carrying route of the sheet 3 and configured to detect whether the sheet 3 is present in the respective positions.

Figure 3:
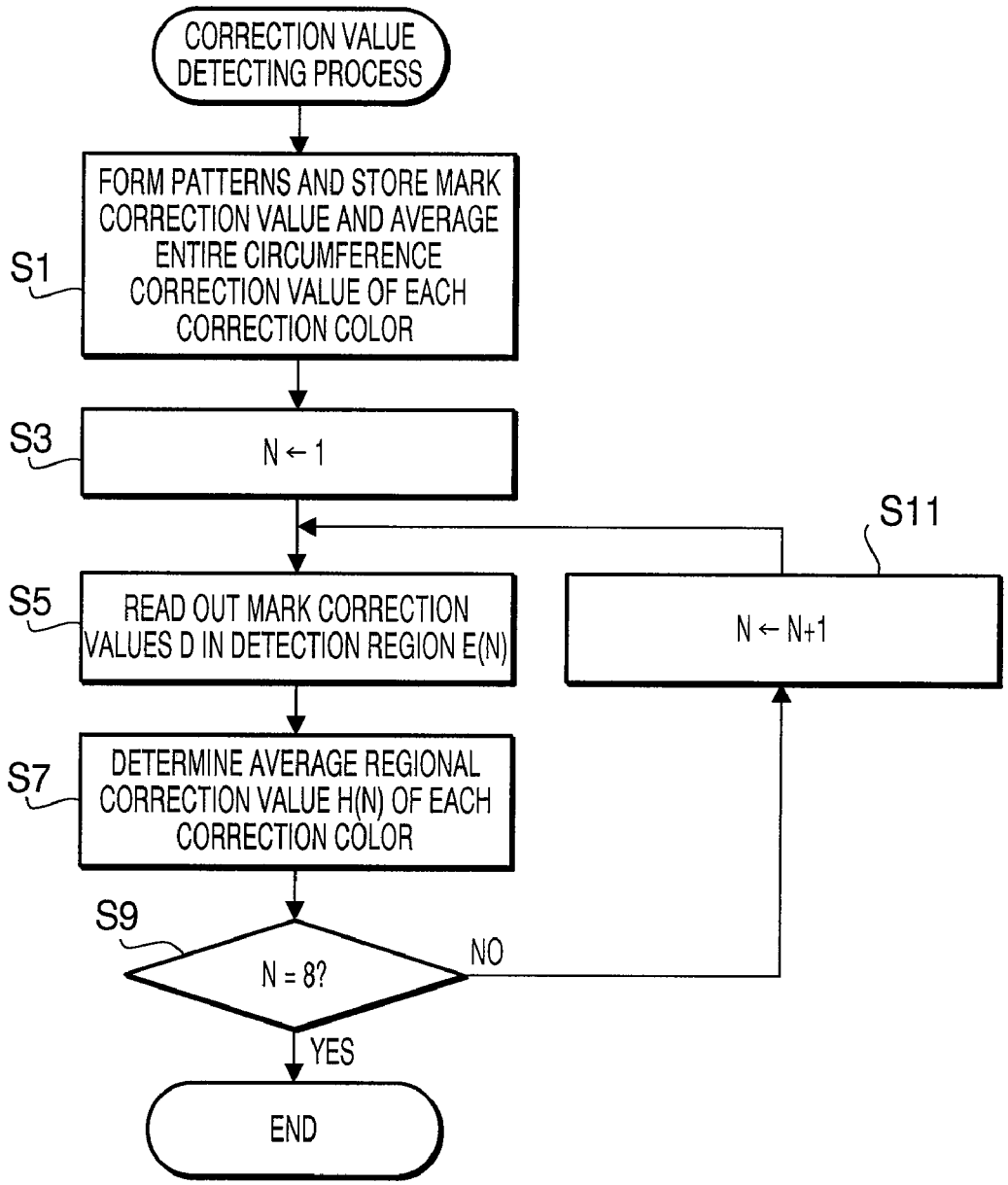
FIG. 3 is a flowchart showing a procedure of a correction value detecting process in the embodiment according to one or more aspects of the present invention.
Figure 4:
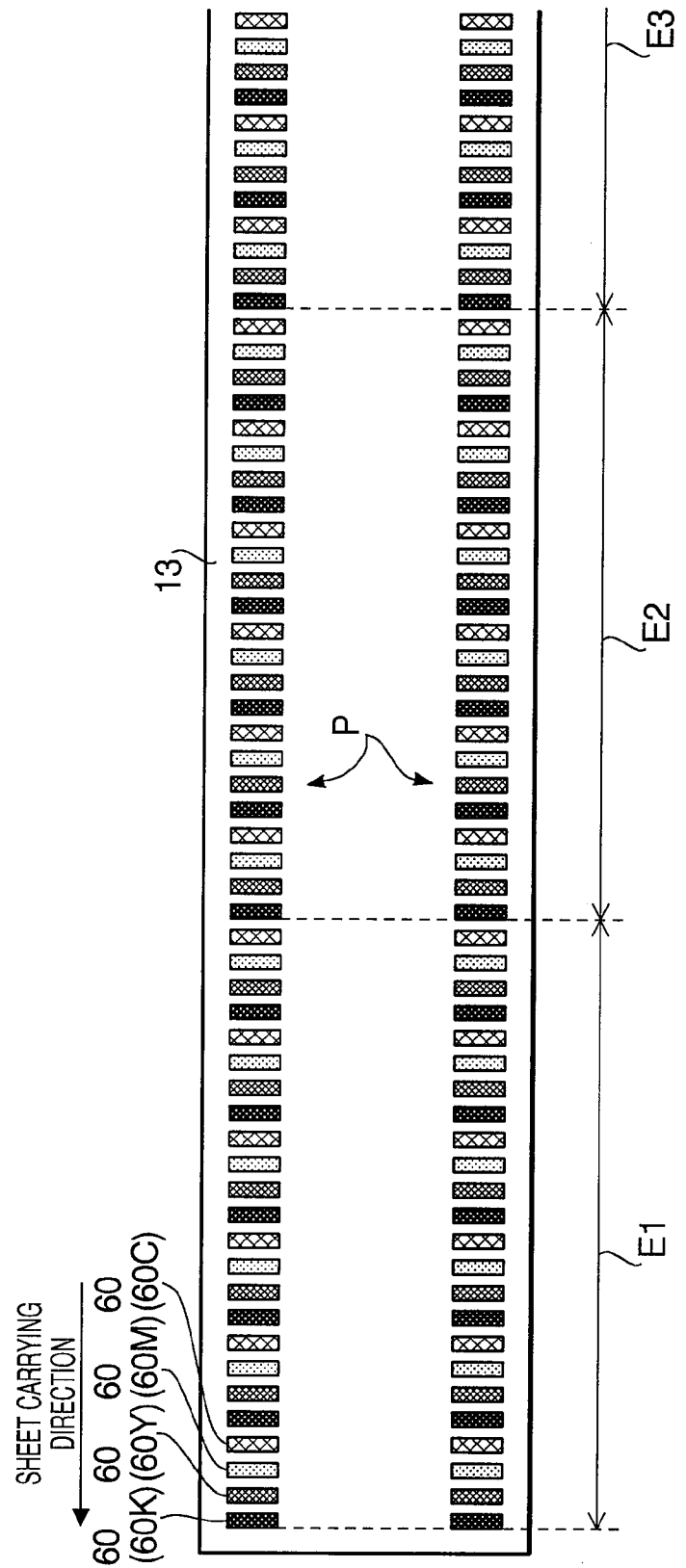
FIG. 4 is a schematic diagram showing a pattern for positional deviation correction in the embodiment according to one or more aspects of the present invention.
Figure 5:
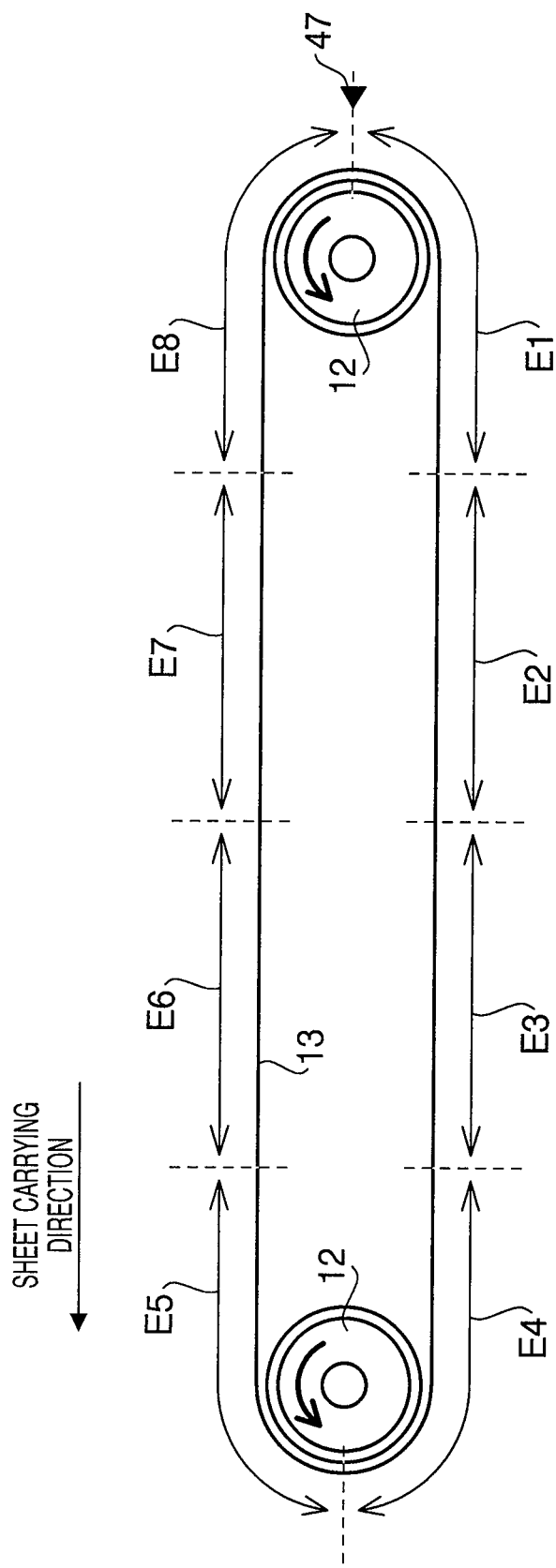
FIG. 5 is a schematic diagram showing detection regions on a belt in the embodiment according to one or more aspects of the present invention.

(Correction Value Detecting Process)
Operations of a correction value detecting process will be described. FIG. 3 is a flowchart showing a procedure of the correction value detecting process. FIG. 4 is a schematic diagram showing a pattern for positional deviation correction. FIG. 5 is a schematic diagram showing detection regions on the belt 13.

The CPU 40 regularly monitors a status of the printer 1 at intervals of a predetermined time period. Further, the CPU 40 determines that a correction value for the positional deviation correction has to be detected when a predetermined condition is satisfied, and then performs a correction value detecting process as shown in FIG. 3. It is noted that "when a predetermined condition is satisfied" includes a case where the printer 1 is powered on, a case where the printer 1 is left in a standby state for a predetermined time period while waiting for a print request, a case where a paper jam is caused in a printing operation, and a case where the number of printed pages after a previous correction reaches a predetermined number. Incidentally, the CPU 40 determines that a paper jam is caused in the case where the sheet 3 is not detected at a predetermined timing by each sheet sensor 48 while the sheet 3 is being conveyed.

The CPU 40 first controls the image forming unit 10 to form the pattern P substantially throughout an entire circumference of the belt 13 (S1).

As shown in FIG. 4, the pattern P includes a plurality of marks 60 aligned in a line at each of both sides of the belt 13. It is noted that the aforementioned pair of pattern detecting sensors 15 is disposed to face the lines of the marks 60 at the both sides of the belt 13.

The marks 60 are aligned at intervals of a predetermined distance in a carrying direction of the sheet 3. The pattern P includes a plurality of groups each of which includes four marks 60 provided in a predetermined order (for example, in an order of black 60K, yellow 60Y, magenta 60M, and cyan 60C).

As illustrated in FIG. 5, a surface of the belt 13 is evenly divided into a plurality of detection regions (for example, 8 regions E1 to E8) in a circumferential direction. In other words, the entire circumference of the belt 13 is evenly sectioned into a plurality of regions, each of which has the same length in the circumferential direction. Each of the detection regions E includes the same number of groups of the four marks 60 (in the present embodiment, 6 groups).

The CPU 40 determines a positional deviation amount for each color based upon the patterns P formed throughout the entire circumference of the belt 13. Specifically, the CPU 40 detects a position of each mark 60 by comparing output levels of the pattern detecting sensors 15 with a predetermined threshold. Then, in each group of the four marks 60, positional deviation amounts of the marks (60Y, 60M, and 60C) of three colors other than black (hereinafter referred to as correction colors) with respect to the mark 60K of black (hereinafter referred to as a standard color) are determined (more specifically, deviation amounts of the marks 60Y, 60M, and 60C with respect to respective regular distances from the mark 60K are determined). Then, correction values to cancel the deviation amounts determined, namely, correction values to conform respective image forming positions of correction color images to an image forming position of a standard color image are determined as mark correction values D (DY, DM, and DC), and the mark correction values D are stored on the NVRAM 43.

Further, the CPU 40 calculates an average entire circumference deviation for each correction color from the deviation amounts of the marks 60 of each correction color. The average entire circumference deviation represents an average value of the deviation amounts of the marks 60 of each correction color with respect to the marks 60k of the standard color within the entire circumference of the belt 13. The CPU 40 stores, on the NVRAM 43, a correction value to cancel the average entire circumference deviation as an average entire circumference correction value W (WY, WM, or WC). For instance, in the present embodiment, the average entire circumference correction values W (WC, WM, and WY) are values as shown in FIG. 6.

Next, in S3, the CPU 40 initializes a detection region number N (=1~8) to be "1" (S3). In S5, the CPU 40 reads out, from the NVRAM 43, the mark correction values D (DY, DM, and DC) in a detection region E (N) of the detection region number N (S5). Then, in S7, the CPU 40 determines average regional correction values H (N) (=H (N) Y, H (N) M, and H (N) C) based upon the mark correction values D (DY, DM, and DC), respectively, and stores the average regional correction values H (N) on the NVRAM 43 (S7). Thereafter, the CPU 40 determines whether the detection region number N is equal to 8 (S9). When it is determined that the detection region number N is less than 8 (S9: No), the present process goes to S11, in which the detection region number N is incremented by one (S11). After that, the present process goes back to S5. When the aforementioned steps of S5 and S7 are performed for all the detection regions E (N) (S9: Yes), the present process is terminated.

Thereby, a table as illustrated in FIG. 7 is stored on the NVRAM 43, the table which represents correspondence between the detection region numbers N and the average regional correction values H (N). It is noted that the detection region number N denotes each phase region on the belt 13 (in the present embodiment, a phase region every a revolution angle of 45 degrees), and the average regional correction values H (N) have correlations with average deviation amounts in the detection regions E, respectively.

(Correcting-Printing Process)

Figure 8:
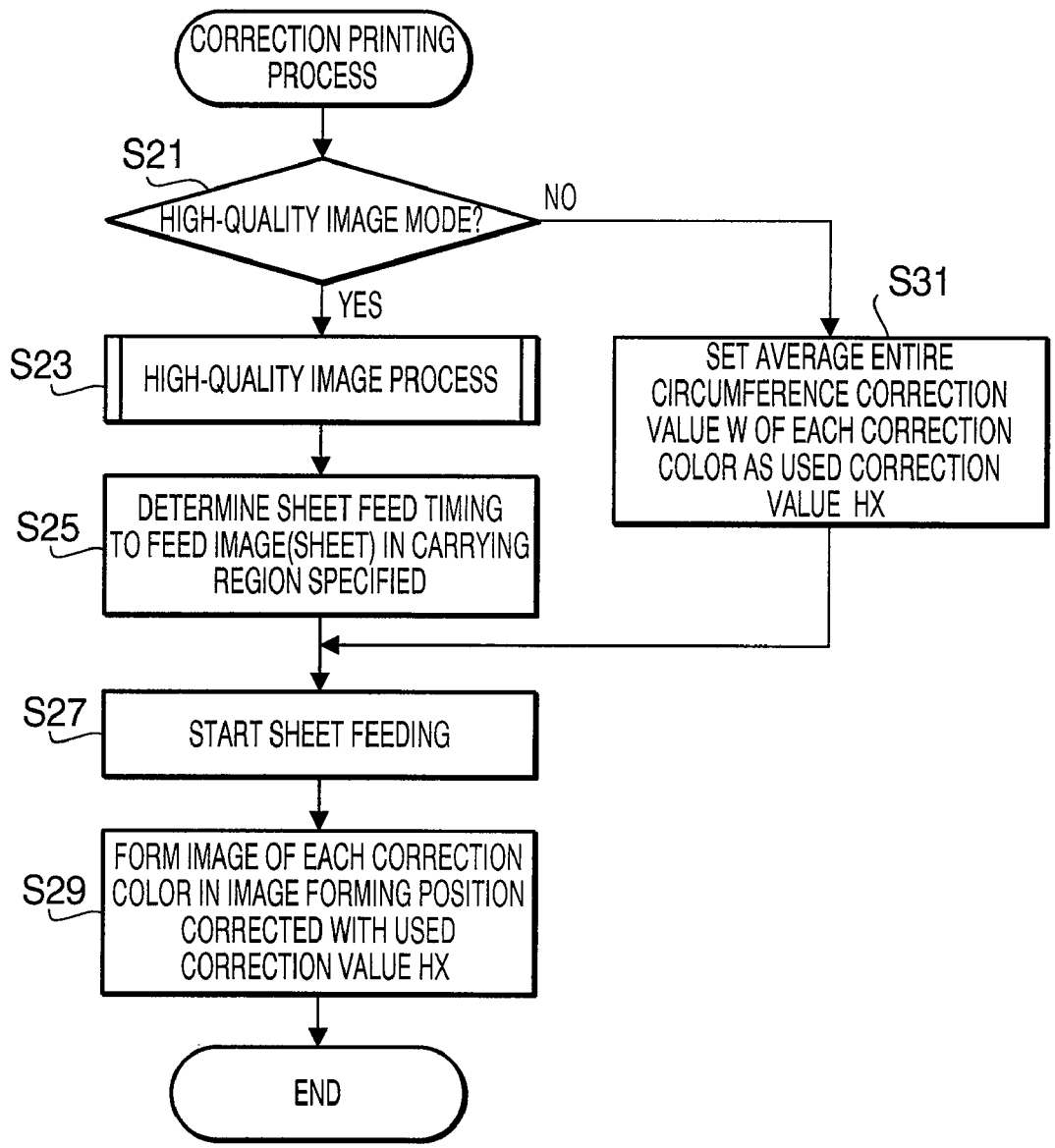
FIG. 8 is a flowchart showing a main routine of a correcting-printing process in the embodiment according to one or more aspects of the present invention.
Figure 9:
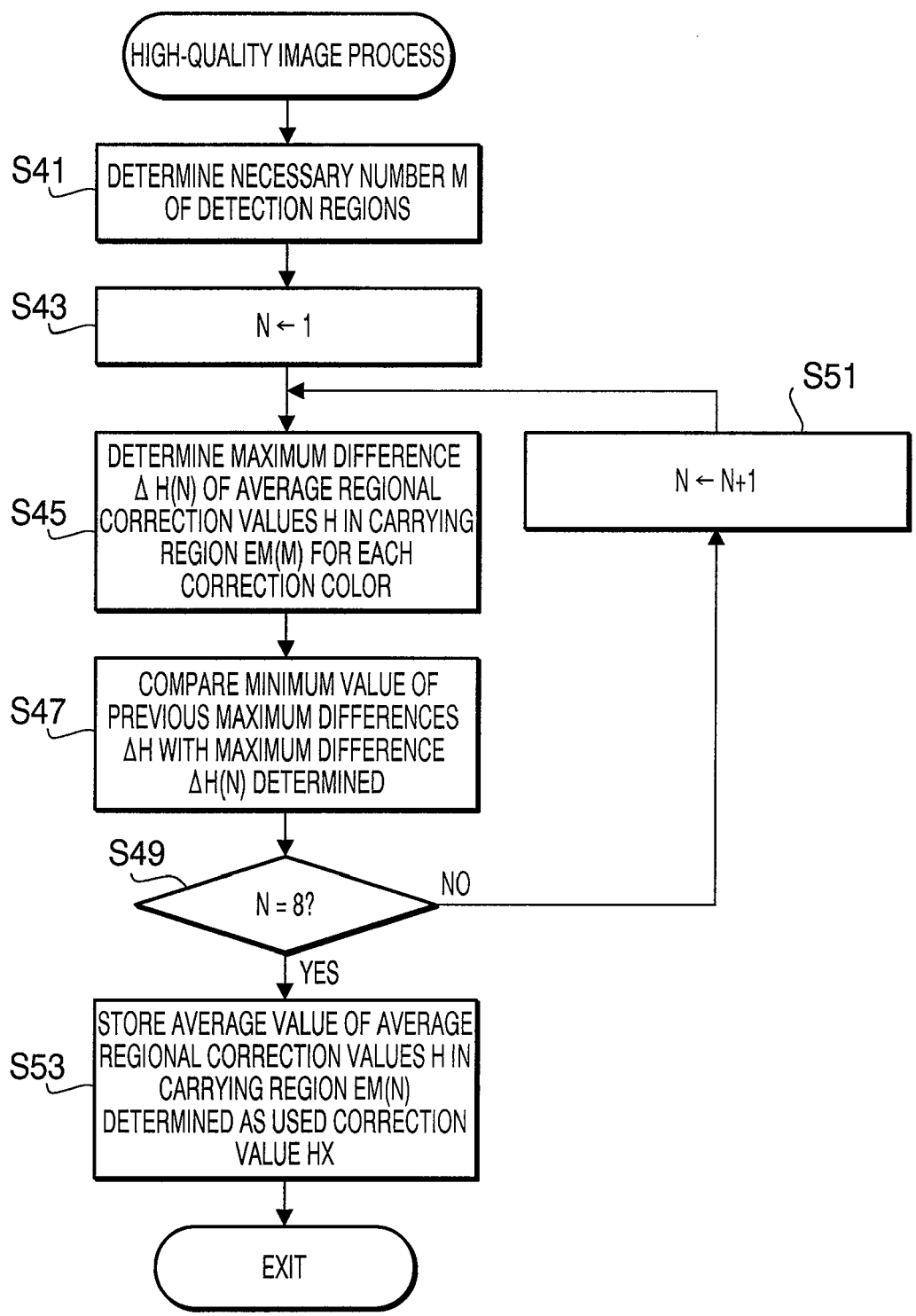
FIG. 9 is a flowchart showing a procedure of a high-quality image process in the embodiment according to one or more aspects of the present invention.

Subsequently, operations of a correcting-printing process will be described. FIG. 8 is a flowchart showing a main routine of a correcting-printing process in the present embodiment. FIG. 9 is a flowchart showing a procedure of a high-quality image process.

The CPU 40 determines whether a print request is received, for instance, from the external computer 50 via the network interface 44, and launches the correcting-printing process when determining that a print request is received. In the correcting-printing process, the CPU 40 first determines whether a high-quality image mode is set on (S21). The printer 1 of the present embodiment is configured to select either a normal mode or the high-quality image mode with the operation unit 46. When the high-quality image mode is set on (S21: Yes), the present process advances to S23, in which the high-quality image process as shown in FIG. 9 is performed.

(A) High-Quality Image Mode

In the high-quality image process, a region on the circumferential surface on the belt 13 is searched and detected, which shows a minimum variation of positional deviation amounts of the correction color marks 60 owing to rotational unevenness of the belt 13. Then, using the detected region, a process for carrying the sheet 3 or an image formed in the region is performed. Specifically, the CPU 40 determines a necessary number M of detection regions E (N) (S41). The necessary number M represents a minimum number of successive detection regions E (N) that can include a length of the sheet 3 in the sheet carrying direction (the length may be a length of an image to be formed on the sheet 3 in the sheet carrying direction). In other words, a region formed by linking detection regions of the necessary number M corresponds to a necessary region on the belt 13 required for carrying the sheet 3 or the image. Hereinafter, the necessary region will be referred to as a carrying region EM (N). It is noted that the length of the sheet 3 or the image in the sheet carrying direction can be grasped based upon print conditions set when the print request has been issued.

Next, in S43, the CPU 40 initializes the detection region number N to be "1" (S43). After that, in S45, the CPU 40 specifies the carrying region EM (N) that begins with the detection region E (N) of the detection region number N, and determines a variation of the average regional correction values H within the carrying region EM (N) specified (S45). Specifically, the CPU 40 determines, for each correction color, a maximum difference ΔH (N) of the average regional correction values H (i.e., a difference between a maximum value and a minimum value of the average regional correction values H) within the carrying region EM (N) (i.e., successive detection regions of the necessary number M that begins with the detection region E (N)).

In S47, the CPU 40 reads out, from the NVRAM 43, a minimum value of maximum differences ΔH (1) to ΔH (N−1) that have previously been determined in other carrying regions EM (1) to EM(N−1), respectively, in the step S45, and compares the above minimum value with the maximum difference ΔH (N). Consequently, when the maximum difference ΔH (N) is smaller than the above minimum value, the minimum value is updated with the maximum difference ΔH (N) and stored on the NVRAM 43. Meanwhile, when the maximum difference ΔH (N) is equal to or larger than the above minimum value, the minimum value is not updated.

In the meantime, when the detection region number N is less than 8 (S49: No), the detection region number N is incremented by one in S51. Thereafter, the present process goes back to S45. When the aforementioned steps S45 and S47 are performed in all the eight carrying regions EM (1) to EM (8), respectively, beginning with the detection region E (1) to E (8) (S49: Yes), a carrying region EM (N), which shows a minimum variation of average regional correction values H therein, is determined. Then, in S53, an average value of the average regional correction values H in the carrying region EM (N) determined is stored on the NVRAM 43 as a finally used correction value HX (=HXY, HXM, or HXC) for each collection color (S53). After that, the present process goes to S25 in FIG. 8. It is noted that the carrying region EM (N) shows a small variation of the average regional correction values H therein. Therefore, an average regional correction value H in one of the successive detection regions that begin with the detection region E (N) within the carrying region EM (N) may, as it is, be employed as the used correction value HX.

In S25, the CPU 40 determines a sheet feed timing that allows the image forming unit 10 to form an image of each color within the carrying region EM (N) determined in S53 (S25). Specifically, the CPU 40 knows a timing at which the belt 13 comes into a phase as shown in FIG. 5 with the aforementioned original point sensor 47.

Then, the CPU 40 can presume a current phase of the belt 13, namely, a current position of each detection region E (N), based upon time that has elapsed since the timing at which the original point has been detected (for example, based upon time measured by an internal clock incorporated in the CPU 40). In addition, for instance, a carrying time period taken for carrying the sheet 3 from the sheet feed tray 4 to the belt 13 is stored on the NVRAM 43 as a result value of a previously implemented experiment. Thus, it is possible to determine an appropriate sheet feed timing from the above information.

Additionally, for example, when the printer 1 is configured to temporarily stop the sheet 3 at the registration roller 6 and adjust a sheet feed timing for feeding the sheet 3 to the belt 13, the sheet feed timing may be adjusted such that the image of each color can be formed within the carrying region EM (N) determined.

When the sheet feed timing comes, the CPU 40 starts feeding the sheet 3 in S27. Then, in S29, the CPU 40 controls the image forming unit 10 to form the image of each color in an image forming position, on the sheet 3, corrected with the used correction value HX.

Figure 10:
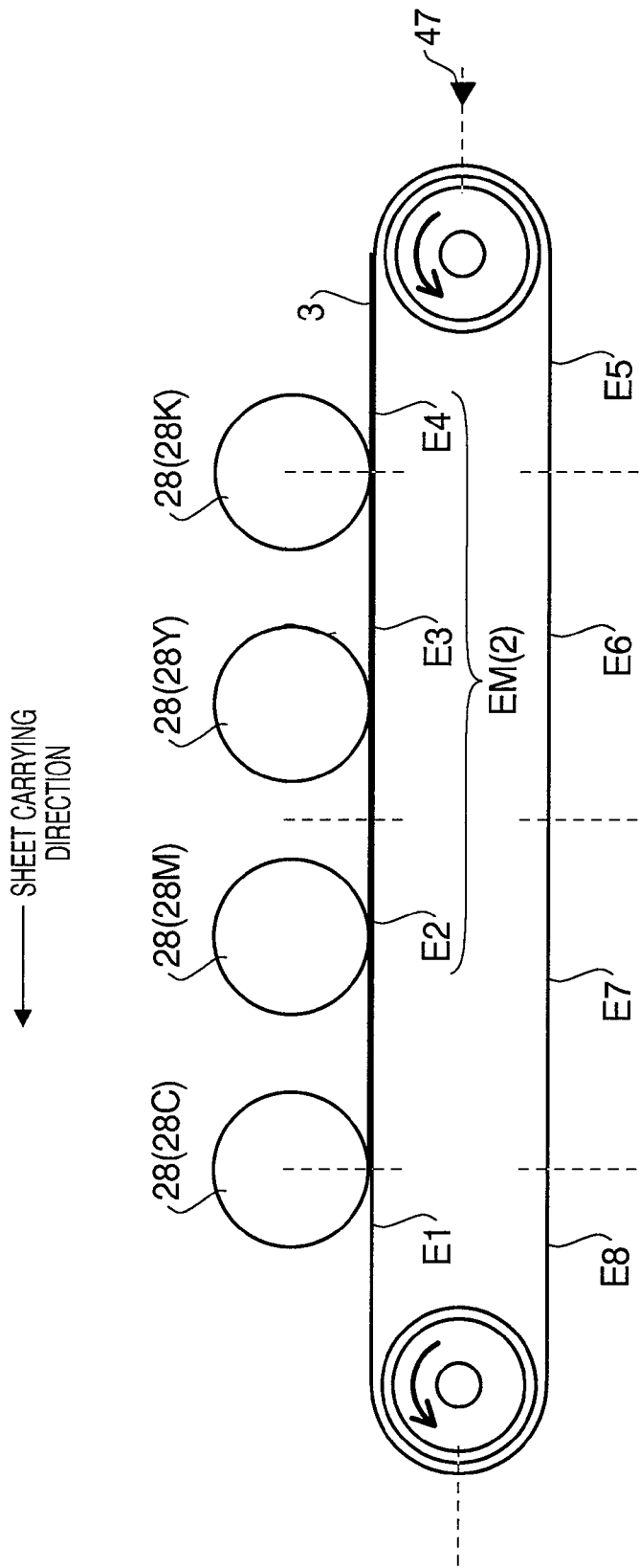
FIG. 10 is a schematic diagram showing positional relationship between a determined carrying region on the belt and a sheet in the embodiment according to one or more aspects of the present invention.

For example, it is assumed that the necessary number M of the detection regions E (N) is "3." In this case, based upon FIG. 7, the carrying region EM (2) (namely, the successive detection regions E (2) to E (4)) having a maximum difference ΔH (N) for each correction color that is equal to or less than "1" is determined as a carrying region EM showing the minimum variation of average regional correction values H therein (S53). Thereby, as illustrated in FIG. 10, the sheet 3 is conveyed in the carrying region EM (2) on the belt 13, and the image forming unit 10 forms the image on the sheet 3 located in the carrying region EM (2) that shows the minimum variation of the average regional correction values H (2), H (3), and H (4) therein.

(B) Normal Mode

Meanwhile, when the normal mode is set on (S21: No), the aforementioned average entire circumference correction value W is set as the used correction value HX in S31. Thereafter, the present process goes to S27, in which the sheet 3 is fed. At this time, unlike the high-quality image mode, wherever the detection region E (N) is located on the belt 13, the sheet 3 is fed (S27) immediately after the aforementioned average entire circumference correction value W is set as the used correction value HX (S31). Then, in S29, the image is formed, on the sheet 3, in an image forming position of each correction color corrected using the average entire circumference correction value W. Thus, owing to a correction error, the image formed in the normal mode is of lower quality than that in the high-quality image mode. However, for instance, when a plurality of pages of image data is sequentially printed, in the high-quality image mode, a single sheet 3 is merely printed every revolution of the belt 13. Meanwhile, in the normal mode, it is possible to print a plurality of sheets 3 every revolution of the belt 13. Hence, the normal mode is useful when a user wishes to complete a printing operation in a short time.

Effects of Embodiment

According to the present embodiment, based upon the variation of the mark correction values D for correcting the positional deviation of each correction color image to be formed by the image forming unit 10, a phase of the belt 13, in which an image forming operation is to be performed by the image forming unit 10, is determined. Thereby, it is possible to secure image quality by specifying a phase of the belt 13 that shows a small variation of mark correction values D therein in preference to a phase that shows a larger variation of mark correction values D therein.

If the carrying region EM (N) had a fixed size, a situation would be caused, in which the fixed size of the carrying region EM (N) is larger than a size of an image to be formed. In this situation, the image might be of low quality due to a variation of mark correction values D in such a large carrying region EM (N). On the contrary, in the present embodiment, the size of the carrying region EM (N) varies depending on the size of the image to be formed on the sheet 3. Therefore, it is possible to avoid the aforementioned situation.

According to the present embodiment, the printer 1 is configured to correct the positional deviation of each correction color image to be formed by the image forming unit 10 based upon the average regional correction values H within the carrying region EM (N) determined. Therefore, it is possible to perform correction of a higher accuracy than an accuracy of correction performed, for example, using the average entire circumference correction value W.

In the present embodiment, the detection regions E (N) have an even size. Therefore, the present embodiment can provide easier processing for the carrying region EM (N) than that in the case where the detection regions E (N) have uneven sizes.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

(Modifications)

According to the aforementioned embodiment, in order to estimate the variation of the mark correction value D, the comparison is made between the minimum value of the previously determined maximum differences ΔH (1) to ΔH (N−1) with the maximum difference ΔH (N) in the carrying region EM (N). However, for example, the degrees of variances of the mark correction value D may be estimated based upon difference between the average entire circumference correction value W and the average regional correction values H of each carrying region EM (N). In this case, the maximum difference ΔH (N) does not have to be determined. Further, the variation of the mark correction value D may be estimated based upon a fluctuation amount or a standard deviation of the mark correction values D per unit time (unit phase).

In the aforementioned embodiment, the mark correction values D (DY, DM, and DC) are employed as correction parameters. However, positional deviation amounts of the correction color marks 60Y, 60M, and 60C with respect to the standard color mark 60K may be employed.

In the aforementioned embodiment, the average correction value H (N) is acquired in the correction value detecting process. However, the average correction value H (N) may previously be stored, for example, at a time of manufacturing the printer 1.

In the aforementioned embodiment, the printer 1 is configured to correct the image forming position of each correction color of the image forming unit 10 based upon an average value of a correction parameter such as the average regional correction value H. However, the printer 1 may be configured to correct the image forming position based upon any value, other than the above average value, which is determined based upon a group of parameters representing deviation amounts of the image forming position. For example, the printer 1 may be configured to correct the image forming position based upon a medium value of two correction parameters that represent a maximum deviation and a minimum deviation of the image forming position, respectively. Here, the followings should be noted. Even though the printer 1 is configured to correct the image forming position based upon a correction value other than the average value of the correction parameter, when the correction value is determined based upon deviation amounts of each correction color mark 60 throughout the entire circumference of the belt 13, it might unfortunately result in an image of low quality. Further, when a carrying region is arbitrarily specified without respect to a variation of correction values therein, it might also result in an image of low quality since the specified carrying region might be a region that causes a significant difference between a correction value determined therein and a proper correction value to correct an actual deviation of the image forming position.

In the aforementioned embodiment, the belt 13 is employed as a rotational body on which the patterns P are formed and the sheet 3 is conveyed. Alternatively, the rotational body may include a feed roller or an intermediate transfer belt.

In the aforementioned embodiment, the printer 1 is a laser printer. However, aspects of the present invention may be applied to an electrophotographic printer, other than the laser printer, such as an LED printer. Also aspects of the present invention may be applied to an intermediate transfer type printer. Further, aspects of the present invention may be applied for a printer using two or more coloring agents.

In the aforementioned embodiment, the printer 1 is configured to determine the positional deviation amount of each color based upon the patterns P formed throughout the entire circumference of the belt 13. However, in aspects of the present invention, the positional deviation amount of each color may be determined based upon the patterns P formed on a part of the circumference of the belt 13.

In the aforementioned embodiment, a carrying region that shows the minimum variation of the mark correction values D therein is determined as a region in which an image is to be formed. However, a carrying region in which the variation of the mark correction values D is equal to or less than a predetermined value may be determined as a region in which the image is to be formed. In this case, when there are two or more carrying regions in which the variation of the mark correction values D is equal to or less than a predetermined value, the carrying regions or one of them that could reach the image forming position the soonest may be determined as a region in which the image is to be formed.

In the aforementioned embodiment, the average entire circumference correction values W are directly determined from the positional deviations of the marks 60 of the correction colors with respect to the positions of the standard color. Alternatively, the average entire circumference correction values W may be determined from the average regional correction value H (N). However, the aforementioned embodiment can provide more accurate average entire circumference correction values W than the above alternative method (configuration).

In the aforementioned embodiment, when the carrying region EM (N) that shows the minimum variation of the average regional correction values H therein is determined in the steps S45 and S47 in FIG. 9, the respective average regional correction values H of all the correction colors are equally treated. However, alternatively, the respective average regional correction values H of all the correction colors may be treated with respective different weights multiplied thereby, depending on a degree of influence of each correction color on the image quality. For example, the average regional correction value H of yellow, which is a hypochromic correction color, may be treated with a coefficient less than 1 multiplied thereby. Further, the average regional correction value H of magenta, which is a correction color having a significant influence on the image quality, may be treated with a coefficient more than 1 multiplied thereby. Furthermore, the carrying region EM (N) may be specified by determining a minimum variation of average regional correction values H therein with respect to a part of the correction colors.

In the aforementioned embodiment, the carrying region EM (N) that shows the minimum variation of the average regional correction values H therein is determined as a region in which the image is to be formed. However, alternatively, a carrying region EM (N) in which a variation of the average regional correction values H is equal to or more than a predetermined value may be specified as a region in which the image is not to be formed.

What is claimed is:

1. An image forming device, comprising:
a rotational body configured to carry a recording medium thereon in a predetermined direction, the rotational body including a plurality of first regions defined thereon that begin with respective different phases on the rotational body;
a forming unit configured to form an image on one of the rotational body and the recording medium carried on the rotational body;
a storage unit configured to store thereon information regarding positional deviations of images formed within each of the first regions; and
a control device configured to:
determine a variation of the positional deviations of the images within each of the first regions based upon the information stored on the storage unit;
select one of the first regions having the smallest variation of the positional deviations from among the plurality of first regions based upon the determined variation of the positional deviations of the images within each of the first regions; and
control the forming unit to form an intended image at an image forming position, which is corrected based upon the information stored on the storage unit, in the selected first region of the rotational body in preference to the unselected first regions.

2. The image forming device according to claim 1, wherein the forming unit forms patterns on the rotational body, wherein the region specifying unit determines a variation of positional deviations of the patterns formed by the forming unit within each of the first regions, and specifies one of the first regions based upon the determined variation of the positional deviations of the patterns within each of the first regions, wherein the image forming device further comprises a first correction value determining unit configured to determine a first correction value to correct the image forming position of the intended image to be formed, based upon the positional deviations of the patterns within the first region specified by the region specifying unit, and wherein the control unit controls the forming unit to form the image of which the intended image forming position is corrected using the first correction value determined by the first correction value determining unit, in the first region specified on the rotational body.

3. The image forming device according to claim 2,
wherein the rotational body includes a plurality of second regions that have a predetermined length in the predetermined direction thereon, wherein each of the first regions begins with every second region and includes one or more successive second regions, wherein the image forming device further comprises a second correction value determining unit configured to detect one or more patterns formed by the image forming unit in each of the second regions and to determine a second correction value representing a positional deviation of the patterns detected in each of the second regions, wherein the region specifying unit determines a variation of the second correction values determined by the second correction value determining unit within each of the first regions and to specify one of the first regions based upon the determined variation of the second correction values within each of the first regions, and wherein the first correction value determining unit determines the first correction value as a representative value of the second correction values within the first region specified by the region specifying unit.

4. The image forming device according to claim 3,
wherein the region specifying unit determines the variation of the second correction values within each of the first regions from a difference between a maximum value and a minimum value of the second correction values within each of the first regions.

5. The image forming device according to claim 3,
wherein the region specifying unit specifies one of the first regions that shows a minimum variation of the second correction values therein.

6. The image forming device according to claim 3,
wherein the region specifying unit specifies one of the first regions in which a variation of the second correction values therein is equal to or less than a predetermined value.

7. The image forming device according to claim 3,
wherein the first correction value determining unit determines the first correction value as an average value of the second correction values within the first region specified by the region specifying unit.

8. The image forming device according to claim 2,
wherein the first region is defined such that a length thereof in the predetermined direction is set depending on a size of the intended image to be formed.

9. The image forming device according to claim 2,
wherein the first region is defined with a length in the predetermined direction set depending on a size of the recording medium to be carried.

10. The image forming device according to claim 2, further comprising a third correction value determining unit configured to determine a third correction value based upon positional deviations of the patterns throughout an entire circumference of the rotational body,
wherein the control unit controls the forming unit to form the intended image of which the image forming position is corrected selectively with one of the first correction value and the third correction value determined by the third correction value determining unit.

11. A method to correct an image forming position of an image to be formed by an image forming device that has a rotational body configured to carry a recording medium thereon in a predetermined direction, the rotational body including a plurality of first regions defined thereon that begin with respective different phases on the rotational body, the method comprising:
a pattern forming step of forming patterns on the rotational body;
a variation determining step of determining a variation of positional deviations of the patterns formed in the pattern forming step within each of the first regions;
a region selecting step of selecting one of the first regions having the smallest variation of the positional deviations from among the plurality of first regions based upon the determined variation of the positional deviations of the patterns within each of the first regions;
a first correction value determining step of determining a first correction value to correct an image forming position of the image to be formed, based upon the positional deviations of the patterns within the first region selected in the region selecting step; and
an image forming step of forming the image of which the image forming position is corrected using the first correction value in the first region selected on the rotational body in preference to the unselected first regions.

12. The method according to claim 11,
wherein the rotational body includes a plurality of second regions that have a predetermined length in the predetermined direction thereon,
wherein each of the first regions begins with every second region and includes one or more successive second regions,
wherein the method further comprises a pattern detecting step of detecting one or more patterns formed in each of the second regions in the pattern forming step and a second correction value determining step of determining a second correction value representing a positional deviation of the patterns detected in each of the second regions,
wherein the variation determining step includes a step of determining a variation of the second correction values determined in the second correction value determining step within each of the first regions,
wherein the region specifying step includes a step of specifying one of the first regions based upon the determined variation of the second correction values within each of the first regions, and
wherein the first correction value determining step includes a step of determining the first correction value as a representative value of the second correction values within the first region specified in the region specifying step.

13. A non-transitory computer readable medium having computer executable instructions stored thereon to be executed by an image forming device that has a rotational body configured to carry a recording medium thereon in a predetermined direction, the rotational body including a plurality of first regions defined thereon that begin with respective different phases on the rotational body, the instructions causing the image forming device to perform a method comprising:
- a pattern forming step of forming patterns on the rotational body;
- a variation determining step of determining a variation of positional deviations of the patterns formed in the pattern forming step within each of the first regions;
- a region selecting step of selecting one of the first regions having the smallest variation of the positional deviations from among the plurality of first regions based upon the determined variation of the positional deviations of the patterns within each of the first regions;
- a first correction value determining step of determining a first correction value to correct an image forming position of the image to be formed, based upon the positional deviations of the patterns within the first region selected in the region selecting step; and
- an image forming step of forming the image of which the image forming position is corrected using the first correction value in the first region selected on the rotational body in preference to the unselected first regions.

14. The computer readable medium according to claim 13,
wherein the rotational body includes a plurality of second regions that have a predetermined length in the predetermined direction thereon,
wherein each of the first regions begins with every second region and includes one or more successive second regions,
wherein the method further comprises a pattern detecting step of detecting one or more patterns formed in each of the second regions in the pattern forming step and a second correction value determining step of determining a second correction value representing a positional deviation of the patterns detected in each of the second regions,
wherein the variation determining step includes a step of determining a variation of the second correction values determined in the second correction value determining step within each of the first regions,
wherein the region specifying step includes a step of specifying one of the first regions based upon the determined variation of the second correction values within each of the first regions, and
wherein the first correction value determining step includes a step of determining the first correction value as a representative value of the second correction values within the first region specified in the region specifying step.

* * * * *

UNITED STATES PATENT AND TRADEMARK OFFICE
CERTIFICATE OF CORRECTION

PATENT NO.        : 8,243,293 B2
APPLICATION NO.   : 12/241121
DATED             : August 14, 2012
INVENTOR(S)       : Tsuyoshi Kushida It is certified that error appears in the above-identified patent and that said Letters Patent is hereby corrected as shown below:

In the Claims:

Column 12, Claim 2, Line 66:
Please delete "unit forms" and replace with --unit is further configured to form--.

Column 13, Claim 2, Line 1:
Please delete "region specifying unit determines" and replace with --control device is further configured to determine--.

Column 13, Claim 2, Line 3:
Please replace "specifies" with --select--.

Column 13, Claim 2, Lines 7-8:
Please delete "image forming device further comprises a first correction value determining unit" and replace with --control device is further--.

Column 13, Claim 2, Line 11:
Please replace "the first" with --the selected first--.

Column 13, Claim 2, Line 12:
Please delete "specified by the region specifying unit."

Column 13, Claim 2, Lines 13-17:
Please replace "wherein the control unit controls the forming unit to form the image of which the intended image forming position is corrected using the first correction value determined by the first correction value determining unit, in the first region specified on the rotational body" with --wherein the control device is further configured to control the forming unit to form the intended image at the corrected image forming position in the selected first region on the rotational body--.

Signed and Sealed this
Twenty-fourth Day of September, 2013

Teresa Stanek Rea
*Deputy Director of the United States Patent and Trademark Office*

CERTIFICATE OF CORRECTION (continued)
U.S. Pat. No. 8,243,293 B2

Column 13, Claim 2, Lines 22-23:
Please delete "every second region" and replace with --one of the second regions--.

Column 13, Claim 3, Lines 26-27:
Please delete "image forming device further comprises a second correction value determining unit" and replace with --control device is further--.

Column 13, Claim 2, Line 28:
Please delete "more patterns" and replace with --more of the patterns--.

Column 13, Claim 3, Lines 33-35:
Please delete "wherein the region specifying unit determines a variation of the second correction values determined by the second correction value determining unit within" and replace with --wherein the control device is further configured to determine a variation of the second correction values within--.

Column 13, Claim 3, Line 37:
Please delete "specify" and replace with --select--.

Column 13, Claim 3, Lines 40-43:
Please replace "wherein the first correction value determining unit determines the first correction value as a representative value of the second correction values within the first region specified by the region specifying unit" with --wherein the control device is further configured to determine the first correction value as a representative value of the second correction values within the selected first region--.

Column 13, Claim 4, Line 45:
Please replace "wherein the region specifying unit determines the variation" with --wherein the control device is further configured to determine the variation--.

Column 13, Claim 5, Line 51:
Please replace "wherein the region specifying unit specifies one of" with --wherein the control device is further configured to select one of--.

Column 13, Claim 6, Line 55:
Please replace "wherein the region specifying unit specifies one of" with --wherein the control device is further configured to select one of--.

Column 13, Claim 7, Lines 60-61:
Please delete "wherein the first correction value determining unit determines" and replace with --wherein the control device is further configured to determine--.

Column 13, Claim 7, Lines 62-63:
Please delete "within the first region specified by the region specifying unit" and replace with --within the selected first region--.

CERTIFICATE OF CORRECTION (continued)
U.S. Pat. No. 8,243,293 B2

Column 14, Claim 9, Line 2:
Please add a comma after "length."

Column 13, Claim 9, Line 3:
Please add a comma after "direction."

Column 14, Claim 10, Lines 5-6:
Please replace "further comprising a third correction value determining unit configured to" with --wherein the control device is further configured to:--.

Column 14, Claim 10, Line 9:
Please add "and" after "rotational body."

Column 14, Claim 10, Line 10
Please replace "wherein the control unit controls" with --control--.

Column 14, Claim 10, Lines 13-14:
Please delete "determined by the third correction value determining unit."

Column 14, Claim 12, Lines 45-46:
Please delete "every second region" and replace with --one of the second regions--.

Column 14, Claim 12, Lines 57-58:
Please delete "determined in the second correction value determining step."

Column 14, Claim 12, Lines 59-60:
Please delete "wherein the region specifying step includes a step of specifying one of the first regions" and replace with --wherein the region selecting step includes a step of selecting one of the first regions having the smallest variation of the second correction values from among the plurality of first regions--.

Column 14, Claim 12, Lines 66-67:
Please delete "specified in the region specifying step" and replace with --selected in the region selecting step--.

Column 16, Claim 14, Line 1:
Please replace "The computer" with --The non-transitory computer--.

CERTIFICATE OF CORRECTION (continued)
U.S. Pat. No. 8,243,293 B2

Column 16, Claim 14, Lines 5-6:
    Please replace "every second region and includes" and replace with --one of the second regions, and includes--.

Column 16, Claim 14, Lines 17-18:
    Please delete "determined in the second correction value determining step."

Column 16, Claim 14, Lines 19-20:
    Please delete "wherein the region specifying step includes a step of specifying one of the first regions" and replace with --wherein the region selecting step includes a step of selecting one of the first regions having the smallest variation of the second correction values from among the plurality of first regions--.

Column 16, Claim 14, Lines 26-27:
    Please delete "specified in the region specifying step" and replace with --selected in the region selecting step--.